United States Patent
Lee et al.

(10) Patent No.: US 10,694,442 B2
(45) Date of Patent: Jun. 23, 2020

(54) OPERATION METHOD OF COMMUNICATION NODE IN COMMUNICATION NETWORK

(71) Applicant: Electronics and Telecommunications Research Institute, Daejeon (KR)

(72) Inventors: Nam Suk Lee, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 15/919,855

(22) Filed: Mar. 13, 2018

(65) Prior Publication Data

US 2018/0270731 A1  Sep. 20, 2018

(30) Foreign Application Priority Data

Mar. 15, 2017 (KR) .......................... 10-2017-0032569

(51) Int. Cl.
*H04W 36/30* (2009.01)
*H04W 36/00* (2009.01)
*H04W 74/00* (2009.01)
*H04W 74/08* (2009.01)
*H04B 7/06* (2006.01)

(52) U.S. Cl.
CPC ....... *H04W 36/30* (2013.01); *H04W 36/0088* (2013.01); *H04W 36/00837* (2018.08); *H04W 74/006* (2013.01); *H04B 7/0617* (2013.01); *H04W 74/08* (2013.01)

(58) Field of Classification Search
CPC .......... H04B 7/0617; H04W 36/00837; H04W 36/0088; H04W 36/08; H04W 36/30; H04W 36/36; H04W 74/006; H04W 74/08; H04W 76/15
See application file for complete search history.

(56) References Cited

U.S. PATENT DOCUMENTS

| 8,897,232 | B2 | 11/2014 | Kim et al. | |
| 9,693,268 | B2 | 6/2017 | Park et al. | |
| 2005/0197132 | A1* | 9/2005 | Lee | H04L 5/0062 455/450 |
| 2008/0125127 | A1* | 5/2008 | Hwang | H04W 36/36 455/436 |

(Continued)

FOREIGN PATENT DOCUMENTS

| EP | 2725846 A1 | 4/2014 |
| KR | 10-2007-0054483 A | 5/2007 |

*Primary Examiner* — Khoa Huynh
(74) *Attorney, Agent, or Firm* — Rabin & Berdo, P.C.

(57) ABSTRACT

An operation method of a first communication node connected to a first hub in a communication network may comprise measuring signal qualities for a first radio signal received from the first hub and a second radio signal received from a second hub adjacent to the first hub; calculating a difference in the signal qualities for the first radio signal and the second radio signal; comparing the calculated difference with a plurality of predetermined threshold values for handover of the first communication node; and performing a handover-related procedure indicated by one of the plurality of predetermined threshold values based on a result of the comparison.

13 Claims, 7 Drawing Sheets

(56) References Cited

U.S. PATENT DOCUMENTS

| | | | |
|---|---|---|---|
| 2013/0143572 A1* | 6/2013 | Kang | H04W 36/08 |
| | | | 455/437 |
| 2014/0153423 A1 | 6/2014 | Shin et al. | |
| 2015/0038148 A1 | 2/2015 | Park et al. | |
| 2017/0142618 A1 | 5/2017 | Hahn et al. | |
| 2018/0199390 A1* | 7/2018 | Hahn | H04W 76/15 |

* cited by examiner

OPERATION METHOD OF COMMUNICATION NODE IN COMMUNICATION NETWORK

CROSS-REFERENCE TO RELATED APPLICATIONS

This application claims priority to Korean Patent Application No. 10-2017-0032569 filed on Mar. 15, 2017 in the Korean Intellectual Property Office (KIPO), the entire contents of which are hereby incorporated by reference.

BACKGROUND

1. Technical Field

The present disclosure relates to an operation method of a communication node in a communication network, and more specifically, to an operation method of a communication node for supporting mobility of a terminal in a communication network.

2. Related Art

The communication system includes a core network (e.g., a mobility management entity (MME), a serving gateway (SGW), a packet data network (PDW) gateway (PGW), and the like), at least one base station (e.g., a macro base station, a small base station, a relay, and the like), at least one terminal, and the like. The communications between the base station and the terminal may be performed using at least one of various radio access technologies (e.g., 4G communication technologies, 5G communication technologies, wireless local area network (WLAN) technologies, wireless personal area network (WPAN) technologies, etc.).

The base station may be connected to the core network via a wired backhaul or a wireless backhaul. For example, the base station may transmit data, control information, etc. received from the terminal to the core network through the wired backhaul or the wireless backhaul. The base station may also receive data, control information, etc. from the core network via the wired backhaul or the wireless backhaul.

In the communication network, a base station may be divided into a digital unit (DU) and a radio unit (RU) according to their functions. Alternatively, the base station may be divided into a cloud digital unit (CDU) and a remote radio head (RRH). The DU (or CDU) may be connected to the RU (or RRH) via a transport network (e.g., an Xhaul network (or a mobile Xhaul network (MXN), a fronthaul network, a backhaul network, etc.)). The transport network may include at least one Xhaul central unit (XCU) (or mXhaul), at least one hub, at least one terminal, etc. Here, each of the hub and the terminal may be connected to an Xhaul distributed unit (XDU).

In particular, in the MXN which is a transport network, the XCU may support mobility for moving terminals. For example, a moving terminal may refer to a terminal installed on a moving means such as a bus, a train, and a ship. The XCU may support the mobility of the terminals based on a handover between the hubs (or the base stations) to which the moving terminal is connected.

Specifically, in the MXN, a terminal may preferentially release a connection (e.g., radio link) to a serving hub supporting communications of the terminal in the course of performing a handover. Thereafter, the terminal may establish a connection (e.g., radio link) to a target hub that is a handover target. In case that the handover is performed in this way, there is a problem that communication disconnection and transmission delay may occur during the handover of the terminal in the MXN.

SUMMARY

Accordingly, embodiments of the present disclosure provide an operation method of a communication node for preventing a communication disconnection and a transmission delay in a process of supporting mobility of a terminal in a communication network.

In order to achieve the objective of the present disclosure, an operation method of a first communication node connected to a first hub in a communication network may comprise measuring signal qualities for a first radio signal received from the first hub and a second radio signal received from a second hub adjacent to the first hub; calculating a difference in the signal qualities for the first radio signal and the second radio signal; comparing the calculated difference with a plurality of predetermined threshold values for handover of the first communication node; and performing a handover-related procedure indicated by one of the plurality of predetermined threshold values based on a result of the comparison.

The signal qualities may be measured as at least one of reference signal received powers (RSRPs) and reference signal received qualities (RSRQs) of the first and second radio signals.

The plurality of predetermined threshold values may include a first threshold value indicating an establishment of a radio link to the second hub, a second threshold value indicating a change of a hub receiving data from the first communication node, and a third threshold value indicating release of a radio link to the first hub.

When the calculated difference is equal to or less than the first threshold value and the signal quality of the first radio signal is higher than the signal quality of the second radio signal, the performing a handover-related procedure may include transmitting a message including information on the second hub to the first hub; performing a random access procedure to the second hub; performing a radio resource control (RRC) connection to the second hub; and transmitting, to the second hub, a message including information on data that has been received from the first hub.

The random access procedure may be performed through a millimeter-wave band based beamforming.

When a remaining radio resource other than radio resources used for communications of the first hub exists among available radio resources of the first communication node, the random access procedure may be performed using the remaining radio resource.

When a radio resource pre-allocated by the first hub exists for the random access procedure, the random access procedure may be performed using the pre-allocated radio resource.

When the calculated difference is equal to or greater than the second threshold value and the signal quality of the second radio signal is higher than the signal quality of the first radio signal, the performing a handover-related procedure may include transmitting, to the first hub and the second hub, a message including an indicator instructing to change a serving hub of the first communication node to the second hub and an indicator indicating a time point at which the serving hub is to be changed to the second hub; receiving, from the first hub and the second hub, a message including a response to the change of the serving hub.

Here, the performing a handover-related procedure may further include changing the serving hub of the first communication node to the second hub at the time point indicated by the indicator indicating the time point at which the serving hub is to be changed; receiving a message including data from the second hub; and transmitting, to the first hub, a message including information on data that has been received from the second hub.

When the calculated difference is equal to or greater than the third threshold value and the signal quality of the second radio signal is higher than the signal quality of the first radio signal, the performing a handover-related procedure may include transmitting, to the first hub, a message including an indicator requesting release of a radio link between the first communication node and the first hub; and receiving, from the first hub, a message including an indicator indicating that the radio link between the first communication node and the first hub has been released.

In order to achieve the objective of the present disclosure, a first communication node connected to a first hub in a communication network may comprise a processor and a memory storing at least one instruction executed by the processor. Also, the at least one instruction may be configured to measure signal qualities for a first radio signal received from the first hub and a second radio signal received from a second hub adjacent to the first hub; calculate a difference in the signal qualities for the first radio signal and the second radio signal; compare the calculated difference with a plurality of predetermined threshold values for handover of the first communication node; and perform a handover-related procedure indicated by one of the plurality of predetermined threshold values based on a result of the comparison.

The signal qualities may be measured as at least one of reference signal received powers (RSRPs) and reference signal received qualities (RSRQs) of the first and second radio signals.

The plurality of predetermined threshold values may include a first threshold value indicating an establishment of a radio link to the second hub, a second threshold value indicating a change of a hub receiving data from the first communication node, and a third threshold value indicating release of a radio link to the first hub.

When the calculated difference is equal to or less than the first threshold value and the signal quality of the first radio signal is higher than the signal quality of the second radio signal, the at least one instruction may be further configure to transmit a message including information on the second hub to the first hub; perform a random access procedure to the second hub; perform a radio resource control (RRC) connection to the second hub; and transmit, to the second hub, a message including information on data that has been received from the first hub.

The random access procedure may be performed through a millimeter-wave band based beamforming.

When a remaining radio resource other than radio resources used for communications of the first hub exists among available radio resources of the first communication node, the random access procedure may be performed using the remaining radio resource.

When a radio resource pre-allocated by the first hub exists for the random access procedure, the random access procedure may be performed using the pre-allocated radio resource.

When the calculated difference is equal to or greater than the second threshold value and the signal quality of the second radio signal is higher than the signal quality of the first radio signal, the at least one instruction may be further configured to transmit, to the first hub and the second hub, a message including an indicator instructing to change a serving hub of the first communication node to the second hub and an indicator indicating a time point at which the serving hub is to be changed to the second hub; receive, from the first hub and the second hub, a message including a response to the change of the serving hub.

Here, the at least one instruction may be further configured to change the serving hub of the first communication node to the second hub at the time point indicated by the indicator indicating the time point at which the serving hub is to be changed; receive a message including data from the second hub; and transmit, to the first hub, a message including information on data that has been received from the second hub.

When the calculated difference is equal to or greater than the third threshold value and the signal quality of the second radio signal is higher than the signal quality of the first radio signal, the at least one instruction may be further configured to transmit, to the first hub, a message including an indicator requesting release of a radio link between the first communication node and the first hub; and receive, from the first hub, a message including an indicator indicating that the radio link between the first communication node and the first hub has been released.

Using the embodiments according to the present disclosure, in a communication network, a terminal can perform an effective handover in which no disconnection or transmission delay occurs in a handover process. Also, a hub performing the operation method according to the present disclosure has the effect of supporting mobility of the mobile terminal without disconnection or transmission delay.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
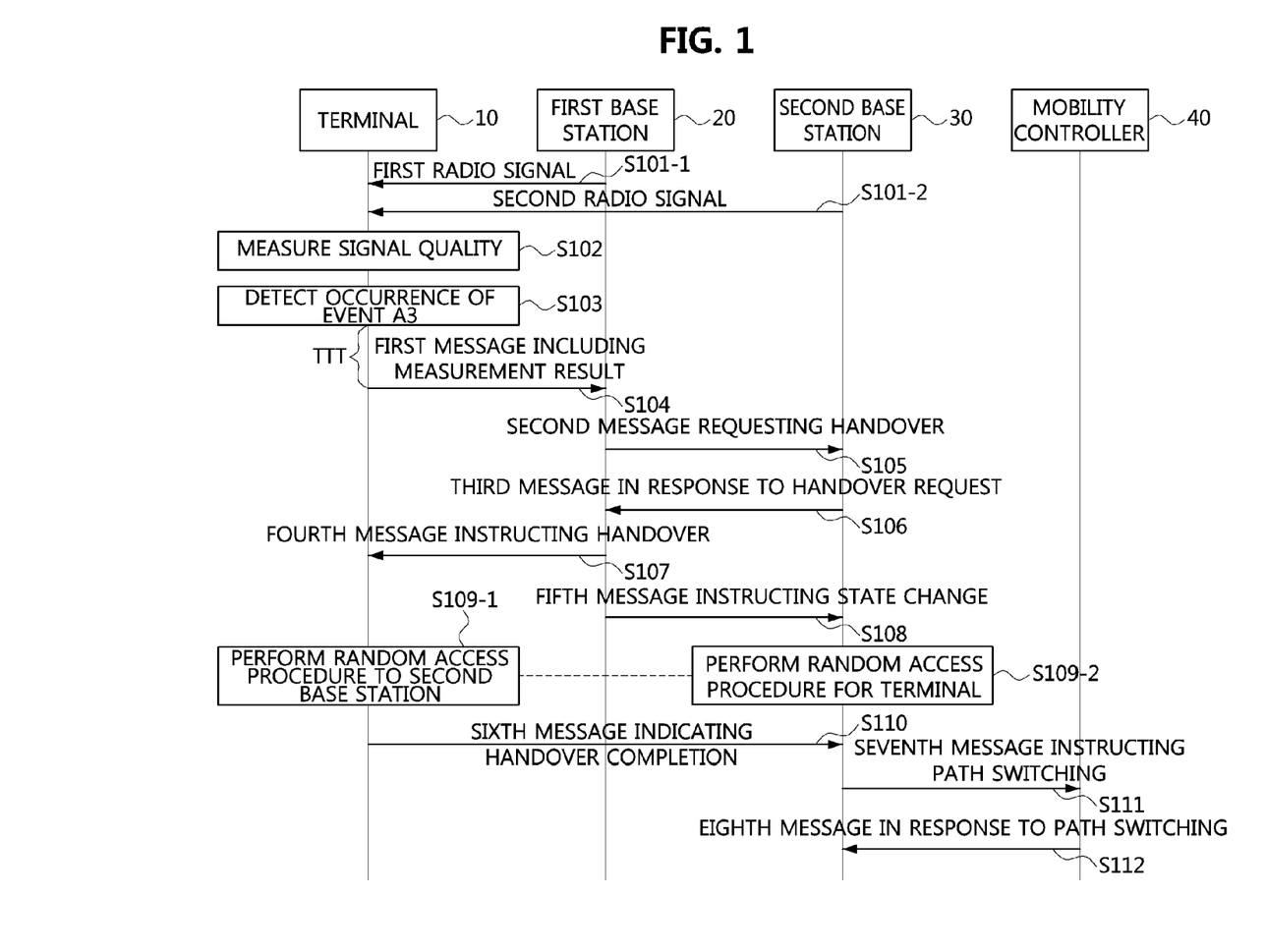
FIG. 1 is a sequence chart illustrating a method of performing handover of a terminal in a communication network.

FIG. 1 is a sequence chart illustrating a method of performing handover of a terminal in a communication network.

Referring to FIG. 1, a communication network may refer to a long term evolution (LTE) network and may include a terminal 10, a first base station 20, a second base station 30, and a mobility controller 40. Here, the terminal 10 may refer to a terminal connected to the first base station 10 and may be a mobile terminal that is moving. Also, the first base station 20 may refer to a serving base station (i.e., serving evolved node B (S-eNB)) that supports the communication of the terminal 10. The second base station 30 may refer to a base station adjacent to at least one of the terminal 10 and the first base station 20 and may be a target base station (i.e., target evolved node B (T-eNB)). Here, it may be assumed that the terminal 10 is moving toward the coverage of the second base station 30 from the coverage of the first base station 20.

First, the terminal 10 may receive a radio signal generated by a plurality of base stations included in the communication network. Here, the plurality of base stations may include the first base station 20 and the second base station 30.

Specifically, the first base station 10 may generate a first radio signal. Thereafter, the first base station 10 may transmit the generated first radio signal to the terminal 10 (S101-1). Also, the second base station 20 may generate a second radio signal. Thereafter, the second base station 10 may transmit the generated second radio signal to the terminal 10 (S101-2). For example, the radio signals generated by the first and second base stations may refer to synchronization signals, reference signals, and the like. Each of the radio signals generated by the first base station and the second base station may also include a message including data destined for the terminal 10. In this way, the terminal 10 may receive the first radio signal transmitted from the first base station 20 and the second radio signal transmitted from the second base station 30.

Then, the terminal 10 may measure a signal quality of the radio signal received from each of the plurality of base stations (S102). That is, the terminal 10 may measure the signal qualities of the first radio signal and the second radio signal. Here, the signal quality for the radio signal may be measured based on at least one of a reference signal received power (RSRP) and a reference signal received quality (RSRQ) for the radio signal. Thereafter, the terminal 10 may detect occurrence of an event A3 (S103). Specifically, the event A3 detected by the terminal 10 will be described below with reference to FIG. 2.

Figure 2:
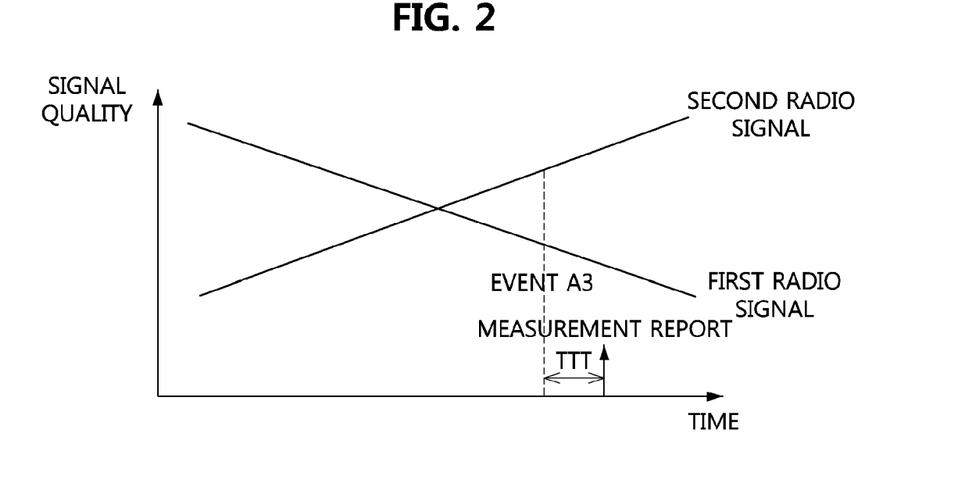
FIG. 2 is a graph illustrating signal qualities of base stations measured for handover of a terminal in a communication network.

FIG. 2 is a graph illustrating signal qualities of base stations measured for handover of a terminal in a communication network.

Referring to FIG. 2, it may be assumed that in the communication network, the terminal 10 is moving toward the coverage of the second base station 30 from the coverage of the first base station 20. Accordingly, the distance between the terminal 10 and the first base station 20 may decrease, so that the signal quality of the first radio signal received by the terminal 10 may be gradually lowered. On the other hand, as the distance between the terminal 10 and the second base station 20 decreases, the signal quality for the second radio signal received at the terminal 10 may become higher.

In such a situation, the terminal 10 may calculate a difference between the signal qualities of the first and second radio signals. Thereafter, when the signal quality of the second radio signal is higher than the signal quality of the first radio signal, and the difference between the signal qualities of the first and second radio signals is equal to or greater than a predetermined threshold value, the terminal 10 may determine that the event A3 has occurred. That is, when the signal quality of the second radio signal of the second base station 30 to be the target base station is higher by the predetermined threshold value than that of the first radio signal of the first base station 20 serving as the serving base station, the terminal 10 may detect the occurrence of the event A3.

Then, the terminal 10 may count a preset time after detecting the occurrence of the event A3. Here, the preset time may be a time for determining a time to trigger (TTT) to report information on the signal qualities measured by the terminal 10 to the first base station 20.

Referring again to FIG. 1, the terminal 10 may generate a first message including information on the measured signal qualities when the preset time has elapsed. That is, the first message may include information on the signal qualities of the first and second radio signals. Thereafter, the terminal 10 may transmit the first message to the first base station 20 (S104).

Thereafter, the first base station 20 may receive the first message including information on the signal qualities from the terminal 10. Thereafter, the first base station 20 may identify the information on the signal qualities included in the first message, and may determine the time for performing the handover of the terminal 10 based on the identified signal qualities. Then, the first base station 20 may generate a second message including an indicator requesting handover. In this case, the second message may further include an indicator indicating a time point at which the handover is to be performed. Then, the first base station 20 may transmit the second message to the second base station 30 (S105).

Then, the second base station 30 may receive the second message including the indicator requesting handover from the first base station 20 and the indicator indicating the time point at which the handover is to be performed. Then, the second base station 30 may generate a third message including an indicator indicating a response to the handover request included in the second message. Then, the second base station may transmit the generated third message to the first base station 20 (S106).

Then, the first base station 20 may receive the third message including the indicator indicating the response to the handover request from the second base station 30. Then, the first base station 20 may generate a fourth message including an indicator instructing handover. Here, the fourth message may further include an indicator indicating a time point at which the handover is to be performed. Then, the first base station 20 may transmit the generated fourth message to the terminal 10 (S107).

Then, the first base station 20 may generate a fifth message including an indicator instructing a state change. Here, the indicator instructing the state change may be an indicator instructing the second base station 30 to change its state to a serving base station of the terminal 10 based on the time point at which the handover is to be performed. Then, the first base station 20 may transmit the generated fifth message to the second base station 30 (S108). Accordingly, the second base station 30 may receive the fifth message including the indicator instructing the state change from the first base station 20.

Meanwhile, the terminal 10 may receive the fourth message including the indicator instructing handover from the first base station 20 (S107). Then, the terminal 10 may obtain the indicator instructing handover and the indicator indicating the time point at which the handover is to be performed from the fourth message. Then, the terminal 10 and the second base station 30 may perform a random access procedure (S109). Specifically, the terminal 10 may perform a random access procedure to the second base station 30 (S109-1). Also, the second base station 30 may perform the random access procedure for the terminal 10.

For example, the random access procedure may include a step of transmitting a random access preamble from the terminal 10 to the second base station 30, a step of transmitting a response to the random access preamble from the second base station 30 to the terminal 10, and a step of transmitting and receiving radio resource control (RRC) signaling between the terminal 10 and the second base station 30, and the like.

Then, the terminal 10 may generate a sixth message including an indicator indicating completion of the handover. Thereafter, the terminal 10 may transmit the generated sixth message to the second base station 30 (S110). Accordingly, the second base station 30 may receive the sixth message including the indicator indicating the completion of the handover from the terminal 10.

Then, the second base station 30 may generate a seventh message including an indicator instructing a path switching. Here, the indicator instructing the path switching may be an indicator instructing the communication network to switch a path for the terminal 10 and the first base station 20 to a path for the terminal 10 and the second base station 30. Then, the second base station may transmit the generated seventh message to the mobility controller 40 included in the communication network (S111).

Then, the mobility controller 40 may receive the seventh message including the indicator instructing the path switching from the second base station 30. The mobility controller 40 may switch the path for the terminal 10 and the first base station 20 to the path for the terminal 10 and the second base station 30 in previously-stored information on paths managed by the mobility controller 40. Thereafter, the mobility controller 40 may generate an eighth message including an indicator indicating a response to the path switching instruction. Then, the mobility controller 40 may transmit the generated eighth message to the second base station 30 (S112).

Through the method as described above, the terminal 10 may perform the handover from the first base station 20 to the second base station 30 in the communication network. That is, in the communication network, the terminal 10 may change its serving base station from the first base station 20 to the second base station 30 based on the signal qualities of the base stations.

Meanwhile, when the handover is performed through the above-described method, the terminal 10 may release the radio link to the first base station 20 and then establish the radio link to the second base station 30. That is, the terminal 10 may perform the handover based on a 'make-before-break' scheme. Accordingly, from the time when the terminal 10 receives the fourth message including the indicator instructing the handover from the first base station 20 to the time when the radio link to the second base station 30 is established through the random access procedure to the second base station 30, the terminal 10 may be disconnected from the communication network. That is, in the communication network, the terminal 10 may be disconnected in the process of performing the handover.

Hereinafter, an operation method of a communication node in a communication network according to an embodiment of the present disclosure for overcoming the problem caused in performing a handover of the terminal 10 described with reference to FIG. 1 and FIG. 2 will be described with reference to FIGS. 3 to 9.

Figure 3:
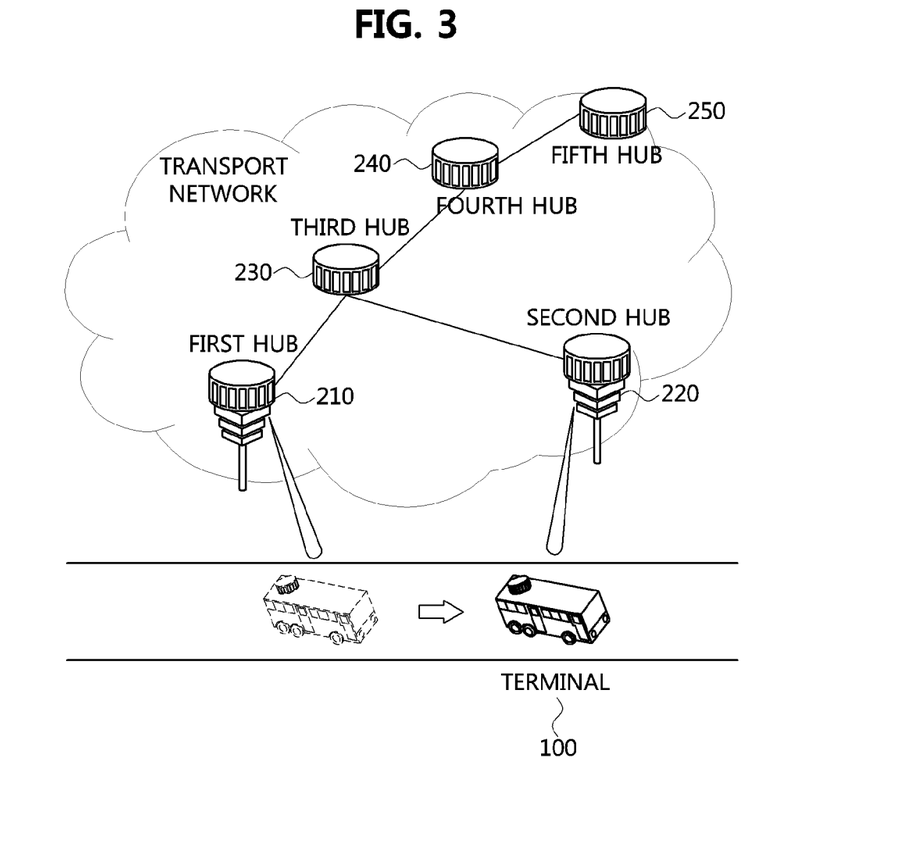
FIG. 3 is a conceptual diagram illustrating a method of performing a handover according to movement of a terminal in a communication network according to an embodiment of the present disclosure.

FIG. 3 is a conceptual diagram illustrating a method of performing a handover according to movement of a terminal in a communication network according to an embodiment of the present disclosure.

Referring to FIG. 3, a communication network according to an embodiment of the present disclosure may be referred to as a transport network. For example, the transport network may refer to the MXN and may support functions of a backhaul and a fronthaul. To this end, the communication network according to an embodiment of the present disclosure may include a terminal 100, a first hub 210, a second hub 220, a third hub 230, a fourth hub 240, and a fifth hub 250.

Specifically, in the communication network, the terminal 100 may be a moving mobile terminal. For example, the terminal 100 may be a terminal installed on a moving means such as a moving bus, a train, and a ship. Also, in the communication network, each of the first hub 210 and the second hub 220 may refer to an end hub to which the terminal 100 may be connected. The third hub 230 may be an anchor hub for supporting communications between the first hub 210 and the second hub 220. Also, each of the fourth hub 240 and the fifth hub 250 may refer to a hub that supports connection to an evolved packet core (EPC) to the third hub 230. Here, the EPC may refer to a core network. Also, each of the fourth hub 240 and the fifth hub 250 may refer to an XCU included in the transport network.

Meanwhile, in the communication network, the terminal 100 may be located within the coverage of the first hub 210 and may perform communications via the first hub 210. That is, the first hub 210 may refer to a serving hub (S-hub) of the terminal 100. At this time, it may be assumed that the terminal 100 is moving from the coverage of the first hub 210 toward the coverage of the second hub 220.

Here, the terminal 100 may periodically measure the signal quality of the first radio signal received from the first hub 210 and the signal quality of the second radio signal received from the second hub 220. The terminal 100 may then calculate a difference between the signal qualities of the first and second radio signals and perform a handover based on comparison between the calculated difference and a predetermined threshold value. That is, the terminal 100 may perform the handover from the first hub 210 to the second hub 220. In other words, the terminal 100 may change its serving hub from the first hub 210 to the second hub 220 for smooth communications of the terminal 100.

Figure 4:
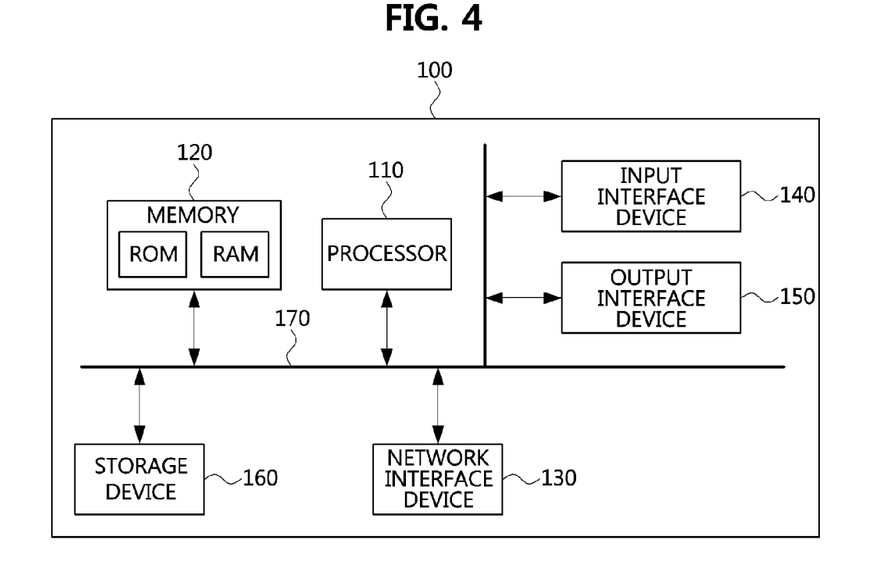
FIG. 4 is a block diagram illustrating a first communication node performing an operation method in a communication network according to an embodiment of the present disclosure.

FIG. 4 is a block diagram illustrating a first communication node performing an operation method in a communication network according to an embodiment of the present disclosure.

Referring to FIG. 4, a communication node 100 may comprise at least one processor 110, a memory 120, and a transceiver 130 connected to a network for performing communications. Also, the communication node 100 may further comprise an input interface device 140, an output interface device 150, a storage device 160, and the like. Each component included in the communication node 100 may communicate with each other as connected through a bus 170. However, each of the components included in the communication node 100 may be connected to the processor 110 via a separate interface or a separate bus rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM). Here, the program executed through the processor 110 may include a plurality of steps for performing an operation method of a communication node in a communication network proposed by the present disclosure.

Hereinafter, an operation method of a communication node in a communication network according to an embodiment of the present disclosure, performed in a first communication node, will be described in detail with reference to FIGS. 5 to 9.

Figure 5:
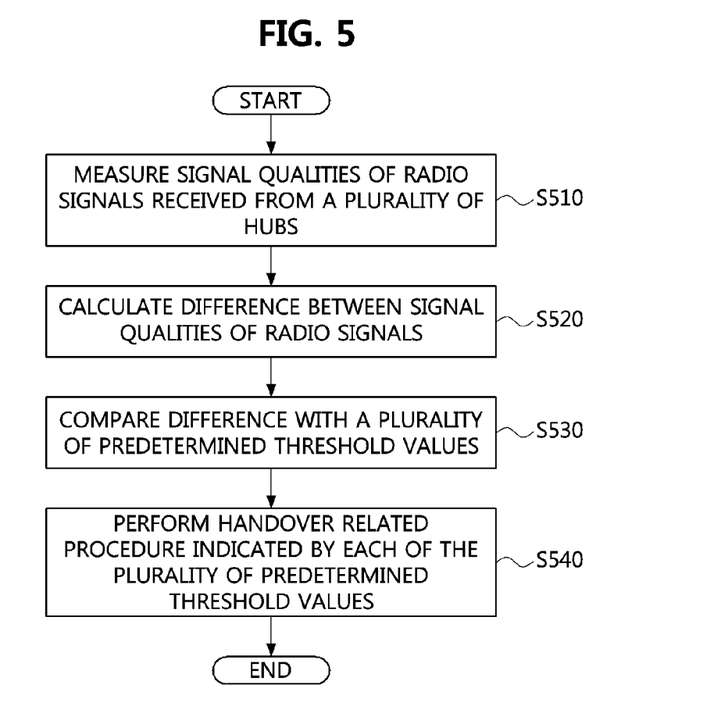
FIG. 5 is a flowchart illustrating an operation method of a communication node in a communication network according to an embodiment of the present disclosure.

FIG. 5 is a flowchart illustrating an operation method of a communication node in a communication network according to an embodiment of the present disclosure.

Referring to FIG. 5, an operation method according to an embodiment of the present disclosure may be performed in a first communication node. Here, the first communication node may be a terminal moving in the communication network. That is, the first communication node may be a terminal moving from the coverage of the first hub toward the coverage of the second hub, such as the terminal described with reference to FIG. 3.

First, the terminal, which is the first communication node according to an embodiment of the present disclosure, may measure signal qualities of radio signals received from a plurality of hubs (S510). Here, the plurality of hubs may be end hubs to which the terminal can be connected among a plurality of hubs included in the communication network, and may include the first hub and the second hub. The first hub may be an S-hub to which the terminal is connected, and the second hub may be a target hub (T-hub) to which the terminal is to move.

Specifically, the first hub included in the communication network may generate a first radio signal. The first hub may then transmit the generated first radio signal to the terminal. Also, the second hub included in the communication network may generate a second radio signal. The second hub may then transmit the generated second radio signal to the terminal. Accordingly, the terminal may receive the first radio signal transmitted from the first hub and the second radio signal transmitted from the second hub. The terminal may measure the signal qualities for the first radio signal received from the first hub and the second radio signal received from the second hub adjacent to the first hub.

The terminal may then calculate a difference between the signal qualities of radio signals received from the plurality of hubs (S520). Specifically, the terminal may calculate the difference between the signal qualities of the first and second radio signals. Here, the signal quality may be measured based on at least one of RSRP and RSRQ for the first radio signal and the second radio signal.

Thereafter, the terminal may compare the difference between the signal qualities with a plurality of predetermined threshold values preset for handover of the terminal (S530). Here, the predetermined threshold values may include a first threshold value indicating an establishment of a radio link to the second hub, a second threshold value indicating a change of a hub receiving data from the terminal (i.e., a serving hub of the terminal), and a third threshold value indicating release of a radio link to the first hub.

Thereafter, the terminal may perform a handover-related procedure indicated by each of the plurality of predetermined threshold values based on the comparison result (S540). Here, the handover-related procedure indicated by each of the plurality of predetermined threshold values will be specifically described with reference to FIG. 6 below.

Figure 6:
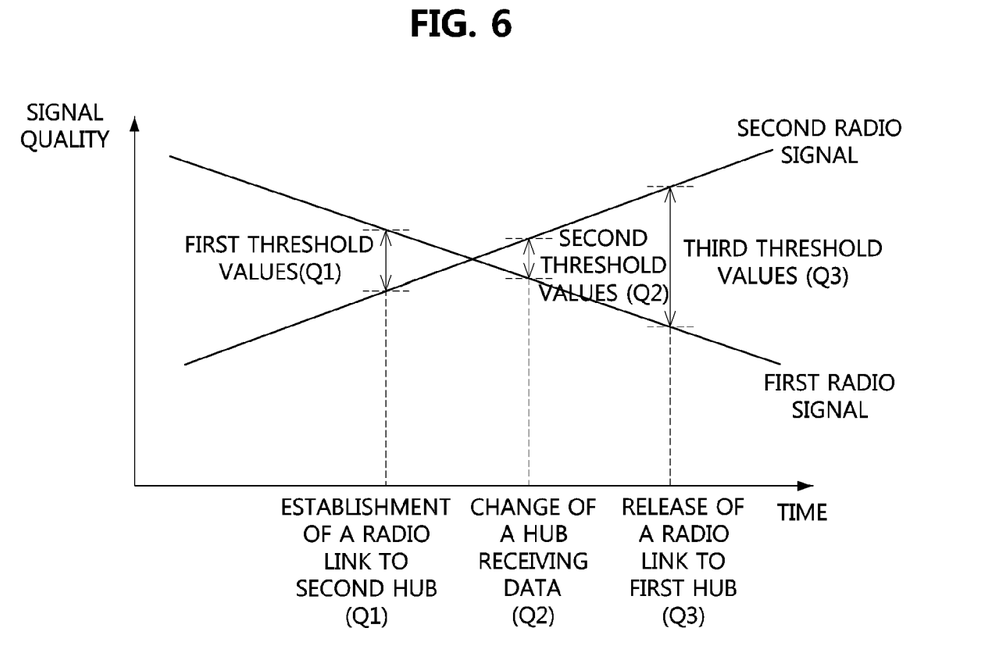
FIG. 6 is a graph illustrating signal qualities of hubs measured for handover of a terminal in a communication network according to an embodiment of the present disclosure.

FIG. 6 is a graph illustrating signal qualities of hubs measured for handover of a terminal in a communication network according to an embodiment of the present disclosure.

Referring to FIG. 6, it may be assumed that the terminal in the communication network is moving from the coverage of the first hub toward the coverage of the second hub. Accordingly, the signal quality for the first radio signal received at the terminal may be gradually lowered by the distance between the terminal and the first hub. On the other hand, as the distance between the terminal and the second hub decreases, the signal quality for the second radio signal received at the terminal may become higher.

In such a situation, the terminal may calculate the difference between the signal qualities for the first radio signal of the first hub and the second radio signal of the second hub. Thereafter, when the signal quality of the first radio signal is higher than the signal quality of the second radio signal, and the difference between the signal qualities of the first and second radio signals is less than or equal to the first threshold value Q1, the terminal may perform a procedure for establishment of a radio link to the second hub.

Thereafter, when the signal quality of the second radio signal is higher than the signal quality of the first radio signal and the difference between the signal qualities of the first and second radio signals is equal to or greater than the second threshold value Q2, the terminal may perform a procedure for change of a hub receiving data (i.e., a serving hub of the terminal).

Thereafter, when the signal quality of the second radio signal is higher than the signal quality of the first radio signal, and the difference between the signal qualities of the first and second radio signals is equal to or greater than the third threshold value Q3, the terminal may perform a procedure for release of a radio link to the first hub.

As described above, the terminal may compare the difference between the signal qualities of the first and second radio signals with the plurality of predetermined threshold values (e.g., Q1, Q2, and Q3), and based on the comparison result, perform the handover-related procedure indicated by one of the threshold values. Hereinafter, an operation method of a communication node in a communication network according to an embodiment of the present disclosure will be described with reference to FIGS. 7 to 9.

Figure 7:
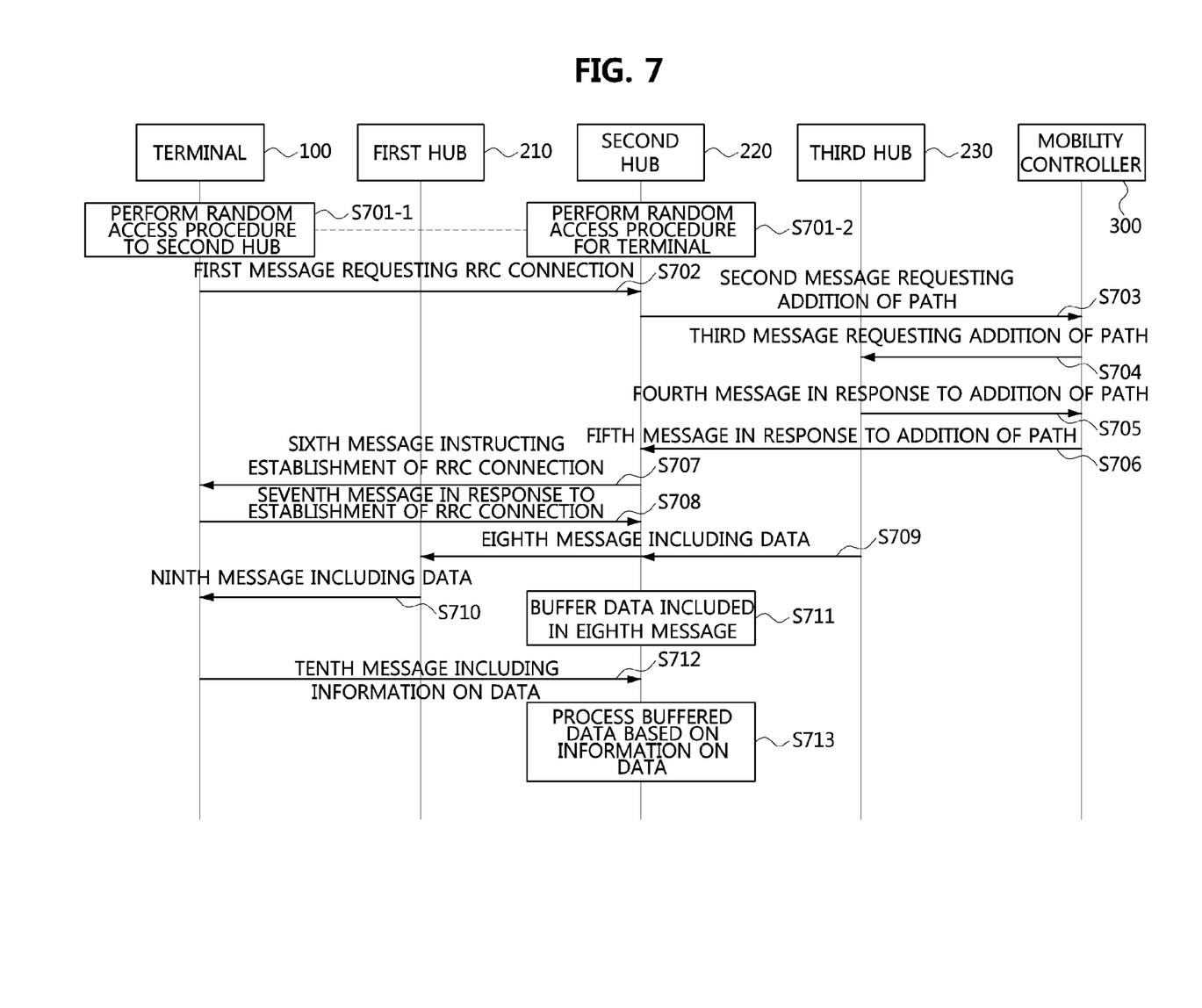
FIG. 7 is a sequence chart illustrating a method for establishing a radio link to a second hub for handover of a terminal in a communication network according to an embodiment of the present disclosure.

FIG. 7 is a sequence chart illustrating a method for establishing a radio link to a second hub for handover of a terminal in a communication network according to an embodiment of the present disclosure.

Referring to FIG. 7, a communication network according to an embodiment of the present disclosure may include a terminal 100, a first hub 210, a second hub 220, a third hub 230, and a mobility controller 300. Here, the terminal 100 may be the moving terminal described with reference to FIGS. 3 and 4. Also, each of the first hub 210 and the second hub 220 may be each of the first hub 210 and the second hub 220 described with reference to FIG. 3 and may be an end hub to which the terminal 100 may be connected. Also, the third hub may refer to the anchor hub described with reference to FIG. 3. Also, the mobility controller 300 may perform functions to support and control the mobility of the terminal included in the communication network.

First, when the signal quality of the first radio signal is higher than the signal quality of the second radio signal, and the difference between the signal qualities of the first and second radio signals is less than or equal to the first threshold value Q1, the terminal may perform the procedure for establishment of a radio link to the second hub which was described with reference to FIG. 6.

Specifically, the terminal 100 may report the signal qualities of the first radio signal and the second radio signal to the first hub 210 serving as a serving hub. For example, the terminal 100 may generate a message that includes information on the signal quality of the first radio signal and the signal quality of the second radio signal, and may transmit the generated message to the first hub 210. Also, the message including information on the signal quality of the first radio signal and the signal quality of the second radio signal may further include information on the second hub 220, such as an identifier of the second hub 220.

Accordingly, the first hub 210 may receive a message including information on the signal qualities of the first and second radio signals from the terminal 100. Then, the first hub 210 may identify the signal quality of the first radio signal and the signal quality of the second radio signal, and may identify the information on the second hub transmitting the second radio signal. Then, the first hub may determine that a radio link between the terminal 100 and the second hub 220 needs to be established.

At this time, when it is determined that a change needs to be made in configuration information (e.g., radio resources for the radio link between the terminal 100 and the first hub 210) on the connection between the terminal 100 and the first hub 210, the first hub 210 may generate a message including the changed configuration information. Then, the first hub 210 may transmit the message to the terminal 100.

Accordingly, the terminal 100 may receive the message including the changed configuration information from the first hub 210, and may identify the changed configuration information included in the message. Thereafter, the terminal 100 may change the configuration of the connection between the terminal 100 and the first hub 210 based on the changed configuration information. Thereafter, the terminal 100 may generate a message including an indicator indicating that the configuration of the connection between the terminal 100 and the first hub 210 has been changed based on the changed configuration information, and transmit the generated message to the first hub 210.

On the other hand, when it is determined that a change does not need to be made in the configuration information on the connection between the terminal 100 and the first hub 210, the above-described procedure for changing the configuration information performed between the terminal 100 and the first hub 210 may be omitted. Then, the terminal 100 and the second hub 220 may perform a random access procedure (S701). That is, the terminal 100 may perform a random access procedure to the second hub 220. Also, the second hub 220 may perform the random access procedure for the terminal.

For example, the terminal 100 may perform the random access procedure to the second hub 220 through beamforming if beamforming based on a millimeter-wave band is possible. Also, when there is a remaining radio resource other than radio resources used for communications of the first hub 210 among available radio resources in the terminal 100, the terminal 100 may use the remaining radio resources to perform the random access procedure. Also, when there is a pre-allocated radio resource for the random access procedure to the second hub 220, which is pre-allocated by the first hub 210, the terminal 100 may perform the random access procedure using the pre-allocated radio resource.

The terminal 100 may then generate a first message requesting a radio resource control (RRC) connection. Here, the first message may include an indicator requesting an RRC connection, information on the first hub 210 which is currently a serving hub of the terminal 100 (e.g., the identifier of the first hub 210), and information on the radio link between the terminal 100 and the first hub 210. Then, the terminal 100 may transmit the first message to the second hub 220 (S702).

Meanwhile, the second hub 220 may receive the first message requesting an RRC connection from the terminal 100. The second hub 220 may then identify, from the first message, the indicator requesting an RRC connection, the information on the first hub 210 serving as a serving hub of the terminal 100, and the information on the radio link between the terminal 100 and the first hub 210. Then, the second hub 220 may generate a second message requesting addition of a path. Here, the second message may include an indicator requesting addition of a path between the terminal 100 and the second hub 220. Then, the second hub 220 may transmit the second message to the mobility controller 300 (S703).

Accordingly, the mobility controller 300 may receive the second message requesting addition of a path from the second hub 220, and may identify that the addition of a path between the terminal 100 and the second hub 220 is requested. The mobility controller 300 may then select the third hub 230 as an anchor hub for supporting communications between the terminal 100 and the second hub 220 among a plurality of hubs included in the communication network.

For example, the mobility controller may determine the third hub 230 as a hub that is capable of transmitting a message directed to the terminal and the second hub 220 in the smallest number of hops among the plurality of hubs included in the communication network. Also, the mobility controller 300 may determine the third hub 230 as a hub that is capable of transmitting a message directed to the terminal and the second hub 220 at the highest transmission rate.

Then, the mobility controller 300 may generate a third message requesting addition of a path. Here, the third message may include an indicator requesting addition of a path supporting communications between the terminal 100 and the second hub 220. Then, the mobility controller 300 may transmit the third message to the third hub 230 (S704).

The third hub 230 may then receive the third message requesting addition of a path from the mobility controller 300. Thereafter, the third hub may identify the indicator requesting addition of a path supporting communications between the terminal 100 and the second hub 220 included in the third message. The third hub 300 may then add a path supporting communications between the terminal 100 and the second hub 220 to information on paths stored in the third hub 300. The third hub 230 may then generate a fourth message in response to the addition of the path. Here, the fourth message may include an indicator indicating that the addition of the path supporting communications between the terminal 100 and the second hub 220 has been completed. Then, the third hub 230 may transmit the fourth message to the mobility controller 300 (S705).

Thereafter, the mobility controller 300 may receive the fifth message in response to the addition of a path from the third hub 230. Thereafter, the mobility controller 300 may identify the indicator indicating that the addition of the path supporting communications between the terminal 100 and the second hub 220 has been completed, and determine that the addition of the path supporting communications between the terminal 100 and the second hub 220 is completed.

Then, the mobility controller 300 may generate a fifth message in response to the addition of the path. Here, the fifth message may include an indicator indicating that the addition of the path supporting communications between the terminal 100 and the second hub 220 has been completed. The mobility controller 300 may then transmit the fifth message to the second hub 220.

The second hub 220 may then generate a sixth message instructing establishment of an RRC connection. Here, the sixth message may include configuration information (e.g., information on radio resources used for an RRC connection between the terminal 100 and the second hub 220) used for establishment of an RRC connection between the terminal 100 and the second hub 220. The second hub 220 may then transmit the sixth message to the terminal 100.

The terminal 100 may then receive the sixth message from the second hub 220 instructing the establishment of an RRC connection. Thereafter, the terminal 100 may identify the configuration information used for the establishment of the RRC connection included in the sixth message, and may perform the RRC connection configuration for the second hub 220 based on the identified configuration information. The terminal 100 may then generate a seventh message in response to the establishment of the RRC connection. Here, the seventh message may include an indicator indicating that the establishment of the RRC connection has been completed. Then, the terminal 100 may transmit the seventh message to the second hub 220 (S708). Accordingly, the second hub 220 may receive the seventh message from the terminal 100 in response to the establishment of the RRC connection.

Meanwhile, the third hub 230 may generate an eighth message including data when receiving data from at least one hub included in the communication network to the terminal 100. Thereafter, the third hub 230 may transmit the eighth message including the data to the first hub 210 and the second hub 220 (S709). Here, the eighth message may be transmitted by the third hub 230 based on a multicast scheme or a multi-unicast scheme.

Then, the first hub 210 may receive the eighth message including the data from the third hub 230. Then, the first hub 210 may obtain the data included in the eighth message, and generate a ninth message including the obtained data. Then, the first hub 210 may transmit the ninth message including the data to the terminal 100 (S710). Meanwhile, the second hub 220 may receive the eighth message including the data from the third hub 230 according to step S709. Then, the second hub 220 may obtain the data included in the eighth message and buffer the obtained data (S711).

Then, the terminal 100 may receive the ninth message including the data from the first hub 210. The terminal 100 may then obtain the data included in the ninth message and may process (e.g., decode) the obtained data. Thereafter, the terminal 100 may generate a tenth message including information on the data that has been received from the first hub 210. Here, the tenth message may include information on data obtained without loss among the data included in the ninth message. The terminal 100 may then transmit the tenth message to the second hub 220.

The second hub 220 may then receive the tenth message including the information on the data from the terminal 100. Then, the second hub 220 may identify the information on the data included in the tenth message. That is, the second hub 220 may identify the information on the data obtained without loss at the terminal 100. Thereafter, the second hub 220 may process the buffered data based on the identified information on the data (S713). For example, the second hub 220 may delete all the buffered data if it is determined that the data transmitted through the eighth message from the first hub 210 is obtained at the terminal 100 without loss.

Through the method as described above, in the communication network according to the embodiment of the present disclosure, the terminal 100 may perform the handover-related procedure based on the comparison result of the difference between the signal qualities of the radio signals and the first threshold value Q1.

Figure 8:
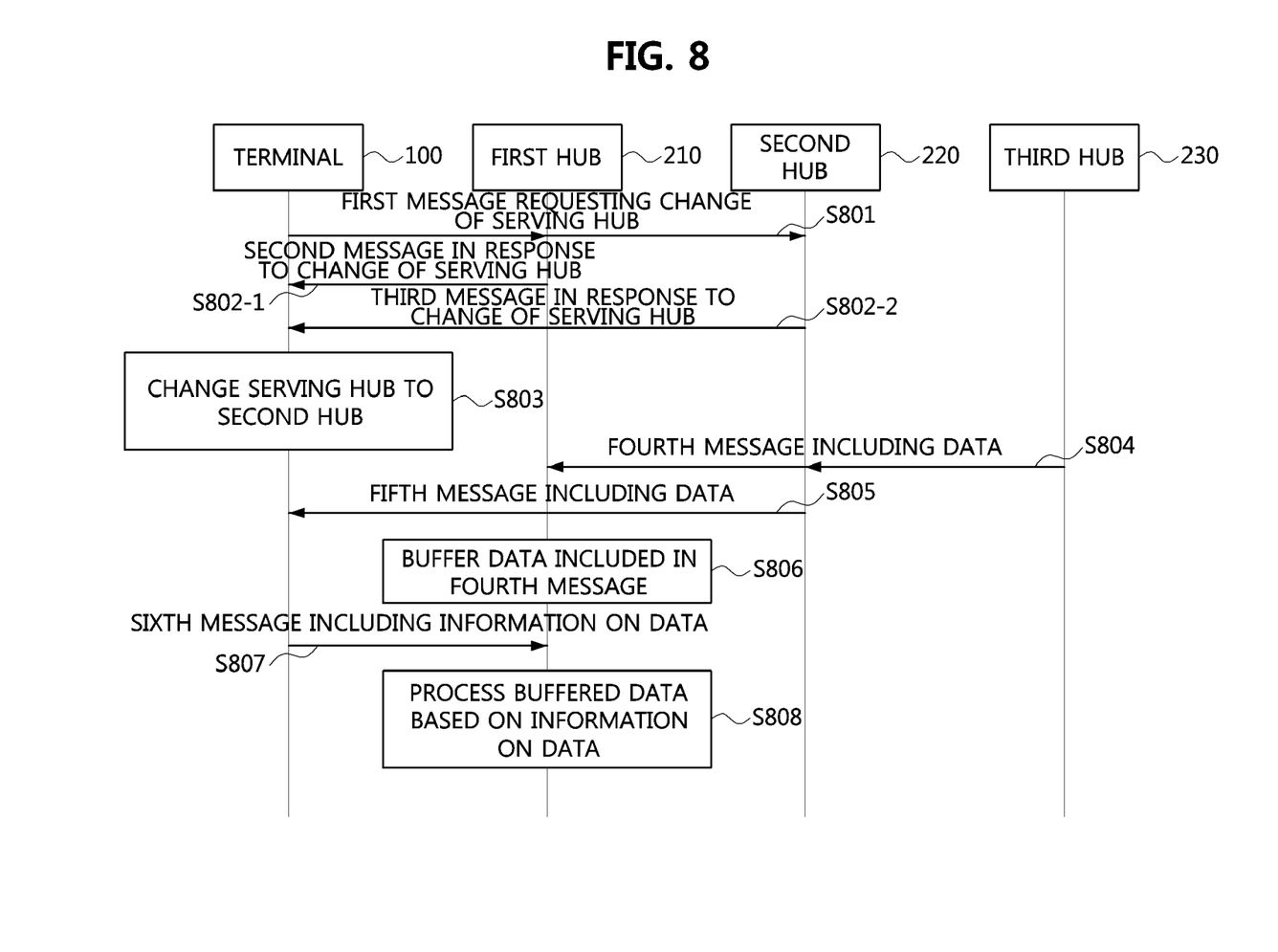
FIG. 8 is a sequence chart illustrating a method for changing a hub receiving data for handover of a terminal in a communication network according to an embodiment of the present disclosure.

FIG. 8 is a sequence chart illustrating a method for changing a hub receiving data for handover of a terminal in a communication network according to an embodiment of the present disclosure.

Referring to FIG. 8, a communication network according to an embodiment of the present disclosure may include a terminal 100, a first hub 210, a second hub 220, and a third hub 230. Here, the terminal 100 may be the moving terminal described with reference to FIGS. 3 and 4. Also, each of the first hub 210 and the second hub 220 may be each of the first hub 210 and the second hub 220 described with reference to FIG. 3 and may be an end hub to which the terminal 100 may be connected. Also, the third hub may refer to the anchor hub described with reference to FIG. 3.

First, when the signal quality of the second radio signal is higher than the signal quality of the first radio signal and the difference between the signal quality of the first radio signal and the signal quality of the second radio signal is equal to or greater than the second threshold value Q2, the terminal may perform the procedure for change of a hub receiving data which was described with reference to FIG. 6.

Specifically, the terminal 100 may generate a first message requesting a change of a hub receiving data (i.e., a serving hub). Here, the first message may include an indicator requesting to change a hub receiving data from the first hub 210 to the second hub 220, and an indicator indicating a time point at which the hub receiving the data is to be changed (e.g., a frame offset value). Then, the terminal 100 may transmit the first message to the first hub 210 and the second hub 220 (S801).

The first hub 210 may then receive the first message from the terminal 100. Then, the first hub 210 may identify the indicator requesting to change the serving hub from the first hub 210 to the second hub 220 and the indicator indicating the time point at which the serving hub is to be changed. Thereafter, the first hub 210 may generate a second message in response to the change of the serving hub. Here, the second message may include the indicator requesting to change the serving hub from the first hub 210 to the second hub 220 and the indicator indicating a time point at which the serving hub is to be changed. Thereafter, the first hub 210 may transmit the second message to the terminal 100 (S802-1).

Also, the second hub 220 may receive the first message requesting to change the serving hub from the terminal 100. Then, the second hub 220 may identify the indicator requesting to change the serving hub from the first hub 210 to the second hub 220 and the indicator indicating the time point at which the serving hub is to be changed. Thereafter, the second hub 220 may generate a third message in response to the change of the hub. Here, the third message may include the indicator requesting to change the serving hub from the first hub 210 to the second hub 220 and the indicator indicating a time point at which the serving hub is to be changed. Thereafter, the second hub 220 may transmit the third message to the terminal 100 (S802-2).

At this time, when it is determined that a change needs to be made in configuration information (e.g., radio resources for the radio link between the terminal 100 and the second hub 220) on the connection between the terminal 100 and the second hub 220, the second hub 220 may generate a message including the changed configuration information. Then, the second hub 220 may transmit the message to the terminal 100.

Accordingly, the terminal 100 may receive the message including the changed configuration information from the second hub 220, and may identify the changed configuration information included in the message. Thereafter, the terminal 100 may change the configuration of the connection between the terminal 100 and the second hub 220 based on the changed configuration information. Thereafter, the terminal 100 may generate a message including an indicator indicating that the configuration of the connection between the terminal 100 and the second hub 220 has been changed based on the changed configuration information, and transmit the generated message to the second hub 220.

On the other hand, when it is determined that a change does not need to be made in the configuration information on the connection between the terminal 100 and the second hub 220, the above-described procedure for changing the configuration information performed between the terminal 100 and the second hub 220 may be omitted.

Meanwhile, the terminal 100 may receive the second message transmitted from the first hub 210 and the third message transmitted from the second hub 220. Then, the terminal 100 may change its serving hub from the first hub 210 to the second hub 220 at the time of changing the serving hub (S803). Also, the first hub 210 and the second hub 220 may change a data processing scheme based on the time point at which the serving hub is to be changed.

Specifically, the third hub 230 may generate a fourth message including data when receiving data from at least one hub included in the communication network to the terminal 100. Thereafter, the third hub 230 may transmit the fourth message including the data to the first hub 210 and the second hub 220 (S804). Here, the fourth message may be transmitted by the third hub 230 based on a multicast scheme or a multi-unicast scheme.

Then, the second hub 220 may receive the fourth message including the data from the third hub 230. Then, the second hub 220 may obtain the data included in the fourth message, and generate a fifth message including the obtained data. Then, the second hub 220 may transmit the fifth message including the data to the terminal 100 (S805). Meanwhile, the second hub 220 may receive the fourth message including the data from the third hub 230 according to step S804.

Then, the first hub 210 may obtain the data included in the fourth message and buffer the obtained data (S806).

Then, the terminal 100 may receive the fifth message including the data from the second hub 220. The terminal 100 may then obtain the data included in the fifth message and may process (e.g., decode) the obtained data. Thereafter, the terminal 100 may generate a sixth message including information on the data that has been received from the second hub 220. Here, the sixth message may include information on data obtained without loss among the data included in the fifth message. The terminal 100 may then transmit the sixth message to the first hub 210 (S807).

The first hub 210 may then receive the sixth message including the information on the data from the terminal 100. Then, the first hub 210 may identify the information on the data included in the sixth message. That is, the first hub 210 may identify the information on the data obtained without loss at the terminal 100. Thereafter, the first hub 210 may process the buffered data based on the identified information on the data (S808). For example, the first hub 210 may delete all the buffered data if it is determined that the data transmitted through the fifth message from the second hub 220 is obtained at the terminal 100 without loss.

Through the method as described above, in the communication network according to the embodiment of the present disclosure, the terminal 100 may perform the handover-related procedure based on the comparison result of the difference between the signal qualities of the radio signals and the second threshold value Q2.

Figure 9:
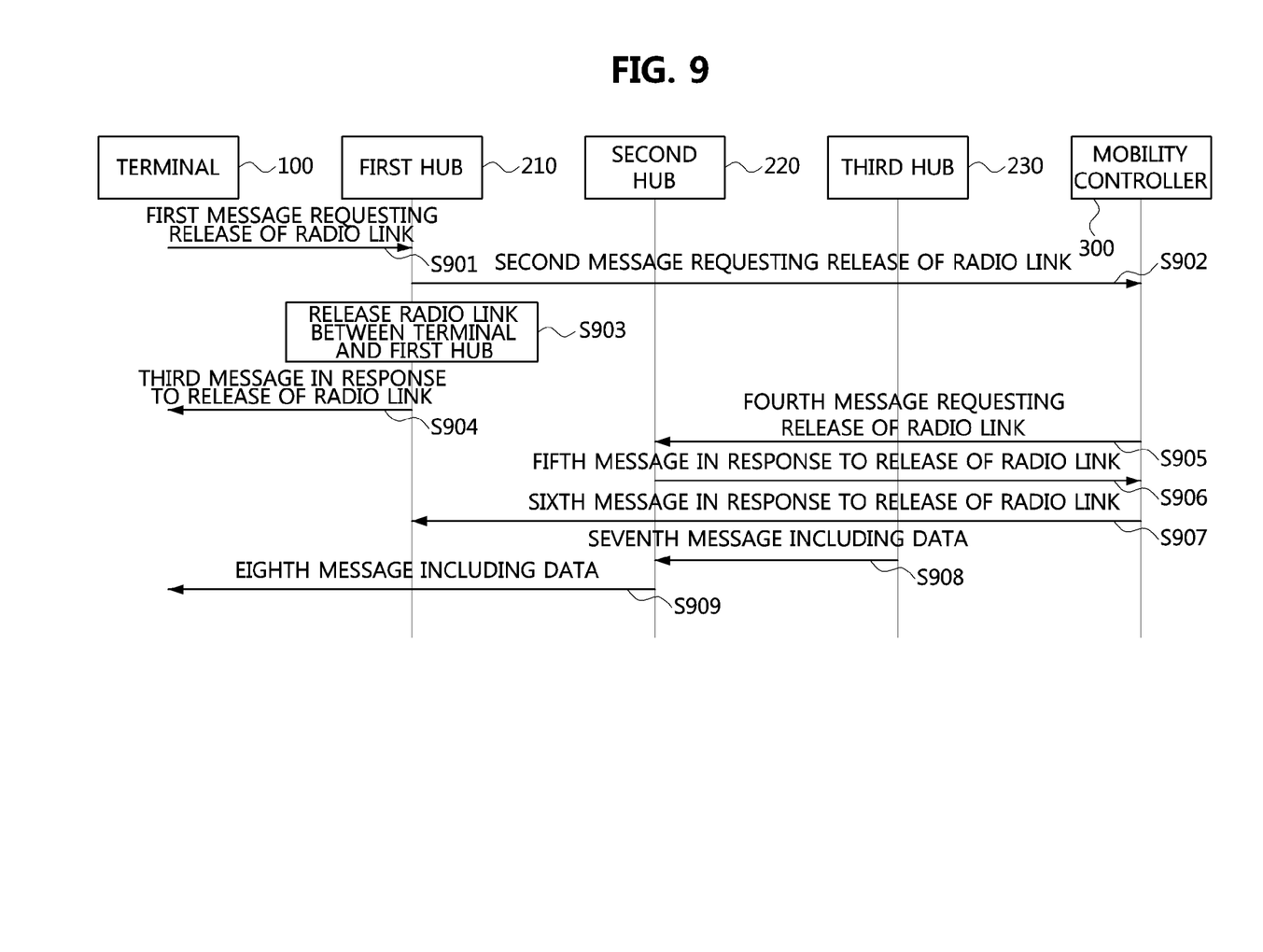
FIG. 9 is a sequence chart illustrating a method for releasing a radio link to a first hub for handover of a terminal in a communication network according to an embodiment of the present disclosure.

FIG. 9 is a sequence chart illustrating a method for releasing a radio link to a first hub for handover of a terminal in a communication network according to an embodiment of the present disclosure.

Referring to FIG. 9, a communication network according to an embodiment of the present disclosure may include a terminal 100, a first hub 210, a second hub 220, a third hub 230, and a mobility controller 300. Here, the terminal 100 may be the moving terminal described with reference to FIGS. 3 and 4. Also, each of the first hub 210 and the second hub 220 may be each of the first hub 210 and the second hub 220 described with reference to FIG. 3 and may be an end hub to which the terminal 100 may be connected. Also, the third hub may refer to the anchor hub described with reference to FIG. 3. Also, the mobility controller 300 may perform functions to support and control the mobility of the terminal included in the communication network.

First, when the signal quality of the second radio signal is higher than the signal quality of the first radio signal, and the difference between the signal qualities of the first and second radio signals is equal to or greater than the third threshold value Q3, the terminal may perform the procedure for releasing of the radio link to the first hub which was described with reference to FIG. 6.

Specifically, the terminal 100 may generate a first message requesting to release a radio link. Here, the first message may include an indicator requesting to release a radio link between the terminal 100 and the first hub 210. Then, the terminal 100 may transmit the first message to the first hub 210 (S901).

The first hub 210 may then receive the first message requesting to release the radio link from the terminal 100. Then, the first hub 210 may identify the indicator requesting to release the radio link between the terminal 100 and the first hub 210 included in the first message. Then, the first hub 210 may generate a second message requesting to releasing the radio link. Here, the second message may include an indicator requesting to release a path associated with the radio link between the terminal 100 and the first hub 210. Then, the first hub 210 may transmit the second message to the mobility controller 300 (S902).

Then, the first hub 210 may release the radio link between the terminal 100 and the first hub 210 (S903). Thereafter, the first hub 210 may generate a third message in response to the release of the radio link. Here, the third message may include an indicator indicating that the radio link between the terminal 100 and the first hub 210 has been released. Then, the first hub 210 may transmit the third message to the terminal 100 (S904). Here, the first hub 210 is described as transmitting the third message after releasing the radio link between the terminal 100 and the first hub 210. However, it may be also possible to release the radio link between the terminal 100 and the first hub 210 after transmitting the third message to the terminal 100. In this case, the third message may further include an indicator indicating a time point at which the radio link between the terminal 100 and the first hub 210 is to be released.

Accordingly, the terminal 100 may receive the third message from the first hub 210 in response to the release of the radio link. Thereafter, the terminal 100 may identify the indicator indicating that the radio link between the terminal 100 and the first hub 210 has been released, and may recognize that the radio link between the terminal 100 and the first hub 210 has been released.

Meanwhile, the mobility controller 300 may receive the second message requesting the release of the radio link from the first hub 210. Then, the mobility controller 300 may identify the indicator requesting to release the path associated with the radio link between the terminal 100 and the first hub 210 included in the second message. Thereafter, the mobility controller 300 may generate a fourth message requesting to release the radio link. Here, the fourth message may include an indicator requesting to release the path associated with the radio link between the terminal 100 and the first hub 210. Then, the mobility controller 300 may transmit the fourth message to the second hub 220 (S905).

The second hub 220 may then receive the fourth message requesting the release of the radio link from the mobility controller 300. Then, the second hub 220 may identify the indicator requesting to release the path associated with the radio link between the terminal 100 and the first hub 210 included in the fourth message. The second hub 220 may then release the path associated with the radio link between the terminal 100 and the first hub 210. Then, the second hub 220 may generate a fifth message in response to the release of the radio link. Here, the fifth message may include an indicator indicating that the path associated with the radio link between the terminal 100 and the first hub 210 has been released. Then, the second hub 220 may transmit the fifth message to the mobility controller 300 (S906).

The mobility controller 300 may then receive the fifth message from the second hub 220 in response to the release of the radio link. Then, the mobility controller 300 may identify the indicator indicating that the path associated with the radio link between the terminal 100 and the first hub 210 has been released. Here, the mobility controller 300 may perform the request and response procedure for releasing the radio link with the third hub 230 in the same manner as steps S905 to S906. Accordingly, the third hub 230 may confirm that the radio link between the terminal 100 and the first hub 210 has been released, and may operate so that the data destined for the terminal 100 is to be transmitted only to the second hub 220.

Thereafter, the mobility controller 300 may generate a sixth message in response to the release of the radio link.

Here, the sixth message may include an indicator indicating that the radio link between the terminal 100 and the first hub 210 has been released. Then, the mobility controller 300 may transmit the sixth message to the first hub 210 (S907).

Accordingly, the first hub 210 may receive the sixth message from the mobility controller 300 in response to the release of the radio link. Thereafter, the first hub 210 may identify the indicator indicating that the radio link between the terminal 100 and the first hub 210 has been released, and confirm that the radio link between the terminal 100 and the first hub 210 has been released.

Meanwhile, the third hub 230 may generate a seventh message including data destined for the terminal 100 when receiving the data from at least one hub included in the communication network. Thereafter, the third hub 230 may transmit the seventh message including the data to the second hub 220 (S908). Here, the seventh message may be transmitted at the third hub 230 based on a unicast scheme.

Then, the second hub 220 may receive the seventh message including the data from the third hub 230. Then, the second hub 220 may obtain the data included in the seventh message, and generate an eighth message including the obtained data. Then, the second hub 220 may transmit the eighth message including the data to the terminal 100 (S909). Then, the terminal 100 may receive the eighth message including the data from the second hub 220. Then, the terminal 100 may obtain the data included in the eighth message and process the obtained data.

Through the method as described above, in the communication network according to the embodiment of the present disclosure, the terminal 100 may perform the handover-related procedure based on the comparison result of the difference between the signal qualities of the radio signals and the third threshold value Q3.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node connected to a first hub in a communication network, the operation method comprising:
measuring signal qualities for a first radio signal received from the first hub and a second radio signal received from a second hub adjacent to the first hub;
calculating a difference in the signal qualities for the first radio signal and the second radio signal;
comparing the calculated difference with a plurality of predetermined threshold values for handover of the first communication node; and
performing a handover-related procedure indicated by one of the plurality of predetermined threshold values based on a result of the comparison,
wherein the plurality of predetermined threshold values include a first threshold value indicating an establishment of a radio link to the second hub, a second threshold value indicating a change of a hub receiving data from the first communication node, and a third threshold value indicating release of a radio link to the first hub, and
the handover-related procedure is performed when the calculated difference is equal to or less than the first threshold value and the signal quality of the first radio signal is higher than the signal quality of the second radio signal.

2. The operation method according to claim 1, wherein the signal qualities are measured as at least one of reference signal received powers (RSRPs) and reference signal received qualities (RSRQs) of the first and second radio signals.

3. The operation method according to claim 1, wherein, when the calculated difference is equal to or less than the first threshold value and the signal quality of the first radio signal is higher than the signal quality of the second radio signal, the performing a handover-related procedure includes:
transmitting a message including information on the second hub to the first hub;
performing a random access procedure to the second hub;
performing a radio resource control (RRC) connection to the second hub; and
transmitting, to the second hub, a message including information on data that has been received from the first hub.

4. The operation method according to claim 3, wherein the random access procedure is performed through a millimeter-wave band based beamforming.

5. The operation method according to claim 3, wherein, when a remaining radio resource other than radio resources used for communications of the first hub exists among available radio resources of the first communication node, the random access procedure is performed using the remaining radio resource.

6. The operation method according to claim 3, wherein, when a radio resource pre-allocated by the first hub exists for the random access procedure, the random access procedure is performed using the pre-allocated radio resource.

7. A first communication node connected to a first hub in a communication network, the first communication node comprising a processor and a memory storing at least one instruction executed by the processor, wherein the at least one instruction is executed to cause the processor to:
measure signal qualities for a first radio signal received from the first hub and a second radio signal received from a second hub adjacent to the first hub;
calculate a difference in the signal qualities for the first radio signal and the second radio signal;
compare the calculated difference with a plurality of predetermined threshold values for handover of the first communication node; and perform a handover-related procedure indicated by one of the plurality of predetermined threshold values based on a result of the comparison, wherein the plurality of predetermined threshold values include a first threshold value indicating an establishment of a radio link to the second hub, a second threshold value indicating a change of a hub receiving data from the first communication node, and a third threshold value indicating release of a radio link to the first hub, and when the calculated difference is equal to or less than the first threshold value and the signal quality of the first radio signal is higher than the signal quality of the second radio signal, the at least one instruction is further executed to cause the processor to perform the handover-related procedure.

8. The first communication node according to claim 7, wherein the signal qualities are measured as at least one of reference signal received powers (RSRPs) and reference signal received qualities (RSRQs) of the first and second radio signals.

9. The first communication node according to claim 7, wherein, when the calculated difference is equal to or less than the first threshold value and the signal quality of the first radio signal is higher than the signal quality of the second radio signal, the at least one instruction is executed to cause the processor to:

transmit a message including information on the second hub to the first hub;

perform a random access procedure to the second hub;

perform a radio resource control (RRC) connection to the second hub; and transmit, to the second hub, a message including information on data that has been received from the first hub.

10. The first communication node according to claim 9, wherein the random access procedure is performed through a millimeter-wave band based beamforming.

11. The first communication node according to claim 9, wherein, when a remaining radio resource other than radio resources used for communications of the first hub exists among available radio resources of the first communication node, the random access procedure is performed using the remaining radio resource.

12. The first communication node according to claim 9, wherein, when a radio resource pre-allocated by the first hub exists for the random access procedure, the random access procedure is performed using the pre-allocated radio resource.

13. An operation method of a first communication node connected to a first hub in a communication network, the operation method comprising:

measuring signal qualities for a first radio signal received from the first hub and a second radio signal received from a second hub adjacent to the first hub;

calculating a difference in the signal qualities for the first radio signal and the second radio signal;

comparing the calculated difference with a plurality of predetermined threshold values for handover of the first communication node; and performing a handover-related procedure indicated by one of the plurality of predetermined threshold values based on a result of the comparison, wherein the plurality of predetermined threshold values include a first threshold value indicating an establishment of a radio link to the second hub, a second threshold value indicating a change of a hub receiving data from the first communication node, and a third threshold value indicating release of a radio link to the first hub, and the handover-related procedure is performed when the calculated difference is equal to or greater than the second threshold value and the signal quality of the second radio signal is higher than the signal quality of the first radio signal.

* * * * *